May 18, 1943. B. C. DEIBEL 2,319,536
TREE MOVER
Filed Jan. 2, 1942 2 Sheets-Sheet 1

Inventor
BUFORD C. DEIBEL,

By *Clarence A. O'Brien*

Attorney

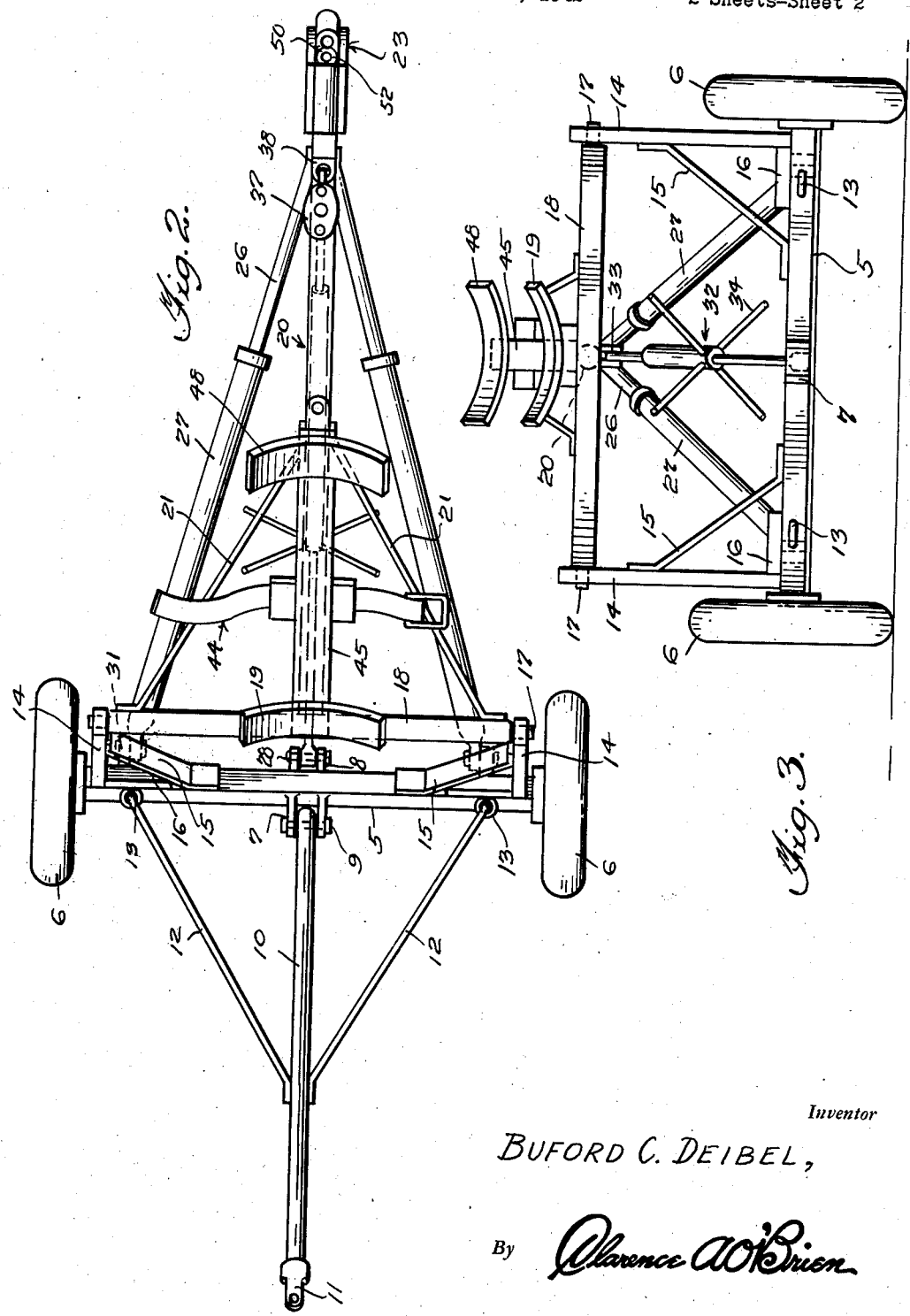

Patented May 18, 1943

2,319,536

UNITED STATES PATENT OFFICE 2,319,536

TREE MOVER

Buford C. Deibel, Buechel, Ky.

Application January 2, 1942, Serial No. 425,455

3 Claims. (Cl. 214—3)

My invention relates to a device for uprooting, transporting and resetting trees, and the primary object of my invention is to provide a simple, efficient relatively inexpensive tree mover of this character, especially adapted for use in connection with a motor truck.

Other important objects and advantages of my invention will be apparent from a reading of the following description taken in connection with the appended drawings, wherein for purposes of illustration I have shown a preferred embodiment of my invention.

In the drawings:

Figure 2 is a top plan view of Figure 1 with the tree removed.

Figure 3 is a rear elevational view with the detachable draw bar removed.

Figure 1:
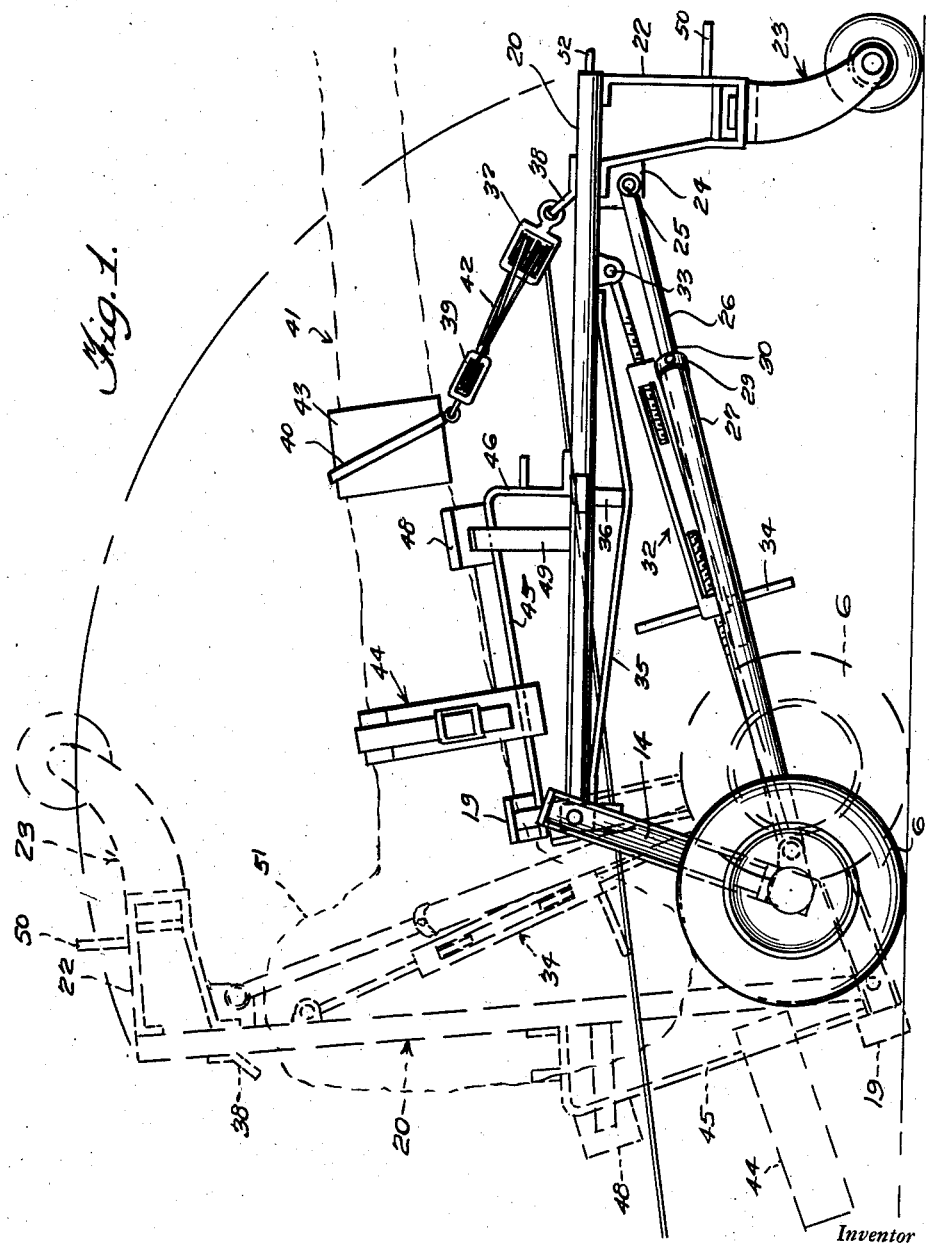
Figure 1 is a general side elevational view showing the embodiment in horizontal tree transporting position in full lines, and showing the same in tree uprooting position in dotted lines.

Referring in detail to the drawings, the numeral 5 designates a transverse axle on which are mounted ground engaging wheels 6, the middle portion of the axle being equipped with a rearwardly projecting clevis 7 and a forwardly projecting clevis 8. The rear clevis 7 accommodates a transverse bolt 9 to pivotally secure the adjacent end of the draw bar 10 whose opposite end is equipped as indicated by the numeral 11 for connection to a motor truck or tractor. Diagonal braces 12 are attached to an intermediate part of the draw bar 10 and have their opposite ends secured in eyes 13 on the axle 5.

Secured to and rising from the axle 5 are the similar vertical standards 14 which are located adjacent the opposite ends of the axle and include diagonal braces 15 and 16. The upper ends of the standards have openings receiving pintles 17 on the opposite ends of a cross member 18 on the middle portion of which is mounted an arcuate tree trunk seat 19. Projecting forwardly from the cross member 18 under the tree trunk seat 19 is a pipe or bar 20 which is braced with respect to the cross member 18 by diagonal braces 21 which are secured at their forward ends to terminal portions of the cross member 18 and at their rear ends to an intermediate part of the pipe or bar 20. From the rear end sides of the pipe or bar 20 depends a U-shaped bracket 22 which mounts the ground engaging caster wheel assembly 23. One arm of the bracket 22 has a lug 24 accommodating a pivot bolt 25 to which the rear end of the rod 26 is pivoted. The rod 26 telescopes in the tube 27 which declines forwardly to connect with and position the axle 5. The rear end of the tube 27 has a collar 29 equipped with a set screw 30 which is adapted to be turned in to lock the rod 26 in an adjusted position in the tube 27, for a purpose to be explained. There are two of the described telescoping arrangements, one on each side of the central longitudinal pipe or rod 20 and diverging forwardly to pivotally connect at their forward ends with lugs 31 projecting rearwardly from the outer end portions of the axle 5 on opposite sides of the clevis 8. A turnbuckle arrangement which is generally designated 32 has one element thereof pivoted as indicated by the numeral 33 to a lug on the underside of the central longitudinal member 20, forwardly of the caster bracket, and has its opposite end pivoted as indicated by the numeral 28 to the clevis 8 which projects rearwardly from the middle part of the axle 5. The turnbuckle sleeve has handles 34 facilitating manual operation of the turnbuckle to swing the axle and wheel assembly either forwardly or rearwardly from a substantially perpendicular position.

Secured to the underside of the central longitudinal member 20 is a downwardly bowed brace strap 35 of metal, which is secured at one end just forwardly of the rear pivotal connection 33 of the turnbuckle and at its forward end to the forward end of the bar 20, with a spacing and tensioning block 36 interposed between the element 20 and the strap 35 as illustrated in Figure 1 of the drawings, to endow the element 20 with sufficient resistance to bending under the strains imposed thereon by the block and tackle arrangement which has a multiple sheave 37 anchored as indicated by the numeral 38 on the rearward part of the element 20, and another sheave 39 which is flexibly connected to a band 40 for encircling the tree trunk 41, the cable running between the sheaves being led forwardly to a suitable winch (not shown) on the motor truck or the like. A protective wrapping 43 is advisedly used under the tree trunk encircling band 40.

Another adjustable size tree trunk embracing member is in the form of a buckle equipped strap 44 and this is looped under the inclined longitudinal portion 45 of a frame element 46 which is atached to the forward part of the element 20 and rises thereabove, declining toward the front end of the element 20 as shown in Figure 1 of the drawings. The already mentioned tree trunk seat 19 is mounted on the depressed forward end of the frame member 46, while another tree trunk rest 48 is mounted on the frame 46 adjacent its rear end, with suitable vertical braces 49 rising to it from the element 20. A draft tongue 50 is located on the bracket 22.

When the device of the invention is brought up to a standing tree for the purpose of uprooting the tree to transport it to another location, the dirt around the outside of the roots of the tree having first been loosened and balled on the roots, the device is stood up in its vertical position, as illustrated in dotted lines in Figure 1 of the drawings against the side of the tree, with the turnbuckle 34 adjusted to put the ground engaging wheel assembly rearwardly of the perpendicular position. In this position the strap 44 is tightened around the tree trunk and the tree trunk encircling band 40 is put in place and the cable 42 adjusted. In this position both of the tree seats 19 and 40 engage the trunk of the tree, and the set screws 30 are then tightened to lock the adjusted condition of the machine. A chain or other suitable draft means is then attached to an eye 52 on the end of the element 20 and to a tractor or to the mentioned motor truck or to a winch and a sufficient pull exerted to bring the machine down to the horizontal position illustrated in full lines in Figure 1 of the drawings and thereby pull the tree out of the ground and bring it to the reclining position shown in the drawings. Thereupon the turnbuckle 34 is operated to swing the ground engaging wheel assembly forwardly of the perpendicular position and into the full line position exemplified in Figure 1 of the drawings, so that the wheel base of the machine is thereby lengthened and the wheels 6 are placed under the relatively great weight of the earth ball 51 involving the roots of the tree and the clinging earth. The set screws 30 are again tightened to maintain this adjusted position of the machine. The detachable draft element 10 is then secured to the axle in the manner indicated and to a tractor or to the motor truck, and the machine and the tree carried thereby is moved over the ground to the place where the tree is to be replanted. The unloading and placing of the tree in the new place is accomplished simply by reversal of the actions and adjustments above described.

Although I have shown and described herein a preferred embodiment of my invention, it is to be definitely understood that I do not wish to limit the application of my invention thereto, except as may be required by the scope of the subjoined claims.

Having described the invention, what is claimed as new is:

1. A device of the character described comprising a rigid non-extensible normally horizontal longitudinal element, a cross member secured at the forward end of said element to extend on opposite sides thereof, standards pivotally depending from the opposite ends of said cross member, an axle extending between and connected to the lower ends of said standards, ground engaging wheels on opposite end portions of said axle, an adjusting turnbuckle connected at its forward end to an intermediate point on said axle and at its rearward end to a rear part of said longitudinal element, said turnbuckle being adjustable to position said axle and its wheels forwardly or rearwardly with respect to said cross member, telescoping braces extending between and connected to said axle and a rear part of said longitudinal member, locking means for holding said telescoping braces in extended or contracted position in accordance with the position of the axle and wheels, a ground engaging caster depending from the rear end of said longitudinal member, and longitudinally spaced tree trunk seats on said longitudinal element.

2. A device according to claim 1 wherein a block and tackle is secured to a rearward part of said longitudinal element, said tackle comprising a tree trunk encircling member whereby through operation of the block and tackle the tree trunk may be drawn toward the device.

3. A device according to claim 1 wherein a block and tackle is secured to a rearward part of said longitudinal element, said tackle comprising a tree trunk encircling member whereby through operation of the block and tackle the tree trunk may be drawn toward the device, a tree trunk strap mounted on said longitudinal member for encircling the tree trunk and holding the tree trunk on said tree trunk seats.

BUFORD C. DEIBEL.